United States Patent Office 3,401,170
Patented Sept. 10, 1968

3,401,170
d,l-2,7-DIHYDROYOHIMBANES AND PROCESS
FOR THEIR PRODUCTION
John Shavel, Jr., Mendham, and Glenn Curtis Morrison, Dover, N.J., assignors to Warner-Lambert Pharmaceutical Company, Morris Plains, N.J., a corporation of Delaware
No Drawing. Filed Mar. 3, 1966, Ser. No. 531,349
3 Claims. (Cl. 260—288)

ABSTRACT OF THE DISCLOSURE

This invention concerns a new class of d,l-2,7-dihydroyohimbanes prepared by contacting a tryptamine with 2-formyl-cyclohexane acetic acid at subambient temperature, reducing the product with a borohydride, acidifying and heating to obtain a tetracyclic lactam, dehydrating said lactam and contacting the resulting dehydroyohimbane salt with zinc in perchloric acid which are useful in cardiac arrhythmias.

---

This invention relates to new and useful heterocyclic compounds and relates more particularly to new and novel d,l-2,7-dihydroyohimbanes having the formula:

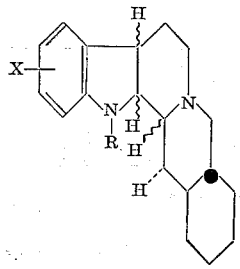

wherein X represents hydrogen, lower alkyl such as methyl, ethyl, isobutyl, hexyl and the like, lower alkoxy such as methoxy and ethoxy, amino, N,N-disubstituted amino such as N,N-dilower alkyl amino in which lower alkyl has the same meaning as defined, etherified mercapto such as methyl mercapto and ethyl mercapto and hydroxyl and R represents hydrogen, lower alkyl, aralkyl such as phenyl lower alkyl in which lower alkyl has the same meaning as defined; substituted aralkyl, particularly substituted phenyl lower alkyl such as methoxybenzyl, halobenzyl and the like and acyl of a carboxylic acid such as acetyl, benzoyl and the like.

The numbering of the compounds of this invention is as follows:

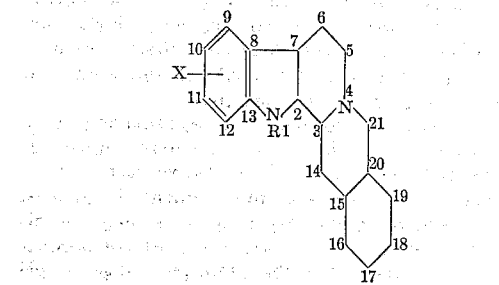

The use of a dot at ring junctions as in structure 4 below denotes beta orientation of the hydrogen atom, whereas the use of a dotted line denotes alpha orientation of the hydrogen atom. The use of a wiggle line in this structure denotes that the hydrogen atom can be either alpha or beta orientated. Since all the compounds described in this patent are d,l-mixtures, the above stereochemical designations are only relative and each structure is to be considered as only one of the two mirror images.

Also employed within the scope of this invention are the pharmaceutically accepted acid addition salts of the above-described bases, their quaternary ammonium salts and N-oxides.

The symbols R and X as used hereinafter have the same meaning as described above.

The invention also includes within its scope a new and novel process for preparing the above compounds as well as the intermediates useful for their synthesis.

The new and novel compounds of this invention have interesting and significant pharmacological activity and are useful as anti-arrhythmic agents.

In order to use these compounds or their salts or their N-oxides, the selected active ingredient from about 1 to 100 mg. is combined with a pharmaceutical carrier to form dosage forms such as tablets and capsules suitable for oral administration or solutions and suspensions suitable for parenteral administration. The dosage regimen may be adjusted according to individual needs.

In addition these compounds are valuable intermediates in the production of other compounds of the 2,7-dihydroyohimbane series.

The compounds of this invention are prepared by reacting 2-formylcyclohexaneacetic acid of the formula:

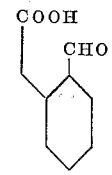

1 with a tryptamine of the formula:

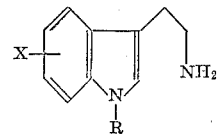

2 to form a lactam of the formula:

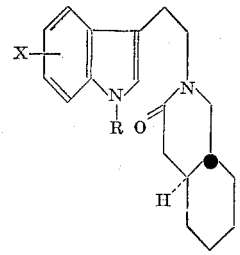

3

This reaction is usually carried out in three steps. First the Schiff base is formed in a solution of triethylamine, water and dimethyl formamide at low temperature such as 0 to —10°. The resulting Schiff base is reduced with an alkali metal borohydride such as potassium borohydried at low temperature more particularly —5° to 20°.

Finally the mixture is diluted with water, the pH adjusted to weakly acidic, for example pH 6, with an acid such as acetic acid and the resulting solution heated, usually at 90–100°.

On cyclodehydration of lactam 3 using a catalyst such as phosphorous oxychloride there is formed a dehydroyohimbane salt of the formula:

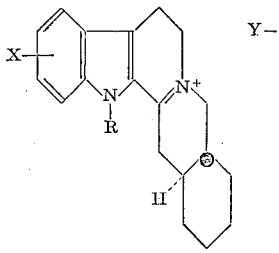

4

Other catalysts which may be employed are polyphosphoric acid and the like.

Reduction of the dehydro compound 4 with a metal-acid system such as zinc-perchloric acid allows the isolation of three products, a 2,7-dihydroyohimbane (5), a yohimbane (6), and a pseudoyohimbane (7).

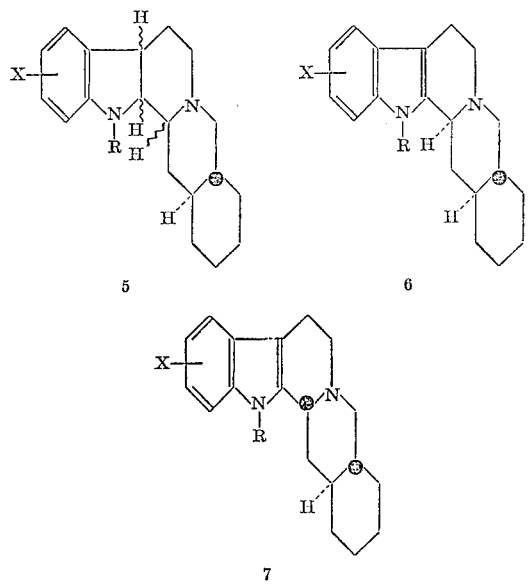

However catalytic reduction of the dehydro compound in an alcohol such as platinum in ethanol leads only to the yohimbane (6).

The compounds of this invention may be converted into their pharmaceutically acceptable nontoxic acid addition and quaternary ammonium salts by conventional procedures. Exemplary of nontoxic acid addition salts are those formed with maleic, fumaric, succinic, tartaric, citric, malic, cinnamic, sulfonic, hydrochloric, hydrobromic, sulfuric, phosphoric and nitric acids. The acid addition salts may be prepared in the conventional manner, by treating a solution or suspension of the free base in an organic solvent with the desired acid, and then recovering the salt which forms by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate or methyl p-toluene sulfonate. The N-oxides are obtained by treating the free base with an oxidizing agent such as hydrogen peroxide.

The following examples are included in order further to illustrate the invention.

Example 1.—trans-Octahydro-2-[2-(indol-3-yl)ethyl]-3(2H)-isoquinolinone

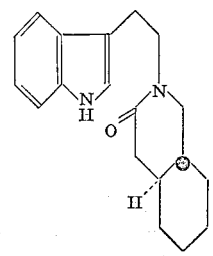

To a solution of 155 g. of 2-formylcyclohexaneacetic acid, 380 ml. of triethylamine and 560 ml. of water in 700 ml. of dimethyl formamide was added a solution of 135 g. of tryptamine and 350 ml. of water in 430 ml. of dimethyl formamide at −5°. After the addition had been completed, the solution was stirred for an additional 30 min. at the same temperature. Then 100 g. of potassium borohydride were added over a 30 min. interval, after which stirring at −5° was continued for 30 min. The cooling bath was removed and stirring continued for an additional 75 min. The mixture was diluted with 940 ml. of water, the pH adjusted to 6 with acetic acid, and heated on the steam bath for 2 hr. On standing there was deposited a solid which after recrystallization from ethanol gave 156 g. (57%) of a crystalline solid, M.P. 240–241°. Further recrystallization gave an analytical sample, M.P. 241.5–242°.

Analysis.—for $C_{19}H_{24}N_2O$: Calcd. C, 76.99; H, 8.16; N, 9.45. Found: C, 76.73; H, 8.16; N, 9.56.

Example 2.—trans-Octahydro-2-[2-(5-methoxyindol-3-yl)ethyl]-3(2H)-isoquinolinone

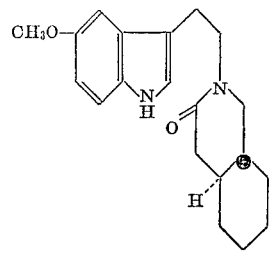

In the same way as described in Example 1, 5-methoxy tryptamine reacted with 2-formylcyclohexane acetic acid gave 68 g. of trans-octahydro-2-[2-(indol-3-yl)ethyl]-3(2H)-isoquinolinone, M.P. 212–213°. Recrystallization from methanol gave an analytical sample, M.P. 214–215°.

Analysis for $C_{20}H_{26}N_2O_2$.—Calcd.: C, 73.59; H, 8.03; N, 8.58. Found: C, 73.40; H, 8.16; N, 8.76.

Example 3.—d,l-3-dehydro-10-methoxyyohimbane chloride

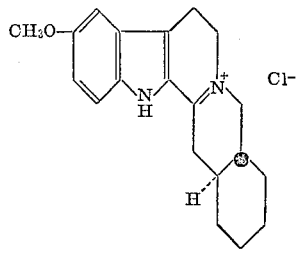

A mixture of 48 g. of trans-octahydro-2-[2-(5-methoxyindol-3-yl)ethyl]-3(2H)-isoquinolinone, 100 ml. of phosphorous oxychloride and 1 l. of benzene was refluxed for 4 hr. Filtration of the cold reaction mixture gave a solid, M.P. 245° dec. Recrystallization from ethanol gave 41 g. (80%) of a solid, M.P. 300–302°.

Analysis for $C_{20}H_{25}ClN_2O$.—Calcd.: C, 69.65; H, 7.31; N, 8.12; Cl, 10.28. Found: C, 69.85; H, 7.33; N, 7.94; Cl, 10.03.

Example 4.—d,l-3-dehydroyohimbane chloride

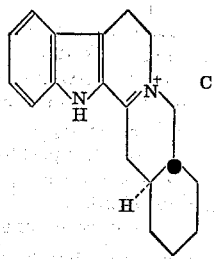

A mixture of 6.4 g. of trans-octahydro-2-[2-(indol-3-yl)ethyl]-3-(2H)-isoquinolinone, 15 ml. of phosphorus oxychloride, and 600 ml. of benzene was refluxed for 4 hr. On standing there was deposited a yellow solid. Recrystallization from ethanoldioxane gave 4.9 g. (71%) of a solid, M.P. 295° dec.

Analysis for $C_{19}H_{23}ClN_2$.—Calcd. C, 72.48; H, 7.36; Cl, 11.26. Found C, 72.40; H, 7.47; Cl, 11.21.

Example 5.—Reduction of d,l-3-dehydro-10-methoxyyohimbane chloride

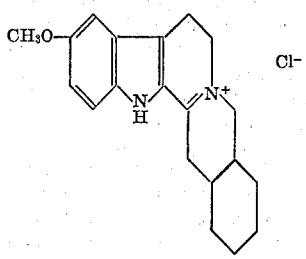

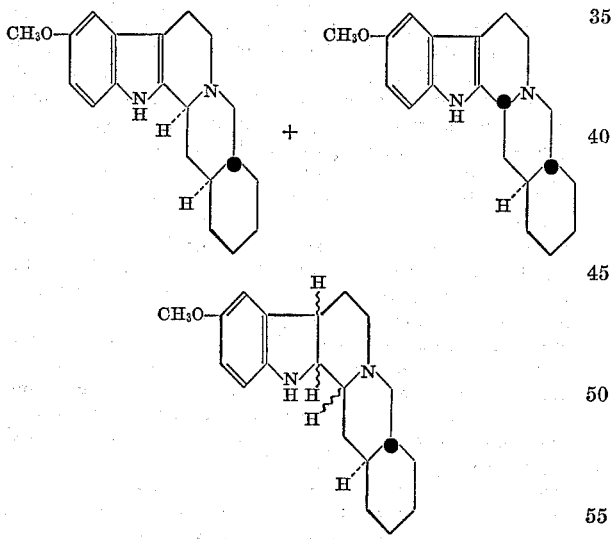

To a refluxing mixture of 38.1 g. of d,l-3-dehydro-10-methoxyyohimbane chloride, 95.4 ml. of perchloric acid, 424 ml. of water and 2.9 l. of methanol was added 95.4 g. of zinc over a 45 min. interval. After the addition had been completed stirring was continued for an additional 3 hr. The solvent was removed from the reaction mixture in vacuo and the residue treated with 250 ml. of 40% sodium hydroxide and 2.8 l. of methylene chloride. The methylene chloride layer was washed with water, dried over sodium sulfate, and the solvent was removed. Crystallization of the residue from acetonitrile gave 6.7 g. (20%), M.P. 180–183°. Recrystallization first from methanol and then from Skellysolve B gave an analytical sample of d,l-10-methoxyyohimbane, M.P. 192.5–193.5°.

Analysis for $C_{20}H_{26}N_2O$.—Calcd.: C, 77.38; H, 8.44; N, 9.03. Found: C, 77.52; H, 8.41; N, 9.25.

The mother liquor from the acetonitrile crystallization was chromatographed on alumina. Elution with ether gave, after recrystallization from methanol, 5.7 g. (17%) of a solid, M.P. 130–132°. Recrystallization from Skellysolve B gave an analytical sample of d,l-2,7-dihydro-10-methoxyyohimbane.

Analysis for $C_{20}H_{28}N_2O$.—Calcd.: C, 76.88; H, 9.03; N, 9.97. Found: C, 77.16; H, 9.00; N, 8.99.

Elution with 5% methanol in chloroform gave after recrystallization from methanol 1.7 g. (5%) of d,l-10-methoxypseudoyohimbane, M.P. 230–233°.

The hydrobromide formed in ether as a crystalline solid, M.P. 265–268°. Recrystallization from acetonitrile gave an analytical sample, M.P. 266–268°.

Analysis for $C_{20}H_{27}BrN_2O$.—Calcd.: C, 61.38; H, 6.95; N, 7.16. Found: C, 61.21; H, 6.95; N, 7.32.

Example 6.—d,l-Yohimbane

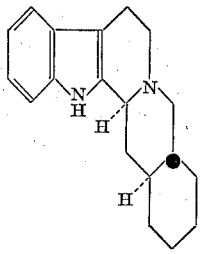

To a solution of 88 g. of d,l-3-dehydroyohimbane chloride in 750 ml. of ethanol was added 3 g. of platinum oxide and the mixture was hydrogenated at atmospheric pressure. Uptake ceased after absorption of the theoretical amount of hydrogen. The hydrogenation mixture was treated with 2 l. of chloroform and 200 ml. of 20% sodium hydroxide solution. The chloroform layer was washed with water, dried over sodium sulfate, and the solvent was removed. The residue after recrystallization from ethanol gave 61 g. (78%) of a crystalline solid, M.P. 179–180°. Further recrystallization gave an analytical sample, M.P. 182.5–183.5°.

Analysis for $C_{19}H_{24}N_2$.—Calcd.: C, 81.38; H, 8.63; N, 9.99. Found: C, 81.46; H, 8.76; N, 10.09.

Example 7.—d,l-Pseudoyohimbane

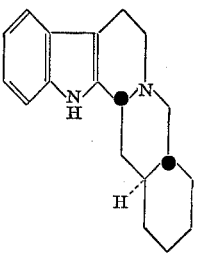

To a solution of 20 g. of d,l-3-dehydroyohimbane chloride, 50 ml. of perchloric acid, 250 ml. of water, and 400 ml. of tetrahydrofuran in 1.2 l. of methanol was added 50 g. of zinc dust portionwise over a 30 min. interval. After the addition had been completed the mixture was refluxed for an additional 3 hr. The reaction mixture was filtered and the solvent removed. The residue was treated with 270 ml. of 20% sodium hydroxide solution and 1.7 l. of chloroform. The chloroform layer was washed with water, dried over sodium sulfate, and the solvent was removed. Recrystallization of the residue from 400 ml. of acetonitrile gave 8.9 g. (50%) of a solid, M.P. 221–222°.

Analysis for $C_{19}H_{24}N_2$.—Calcd.: C, 81.38; H, 8.63; N, 9.99. Found: C, 81.08; H, 8.53; N, 10.24.

The mother liquor was concentrated to 100 ml. On standing there was deposited 4.3 g. (24%) of d,l-yohimbane, M.P. 179–181°.

It is understood that the foregoing detailed description is given merely by way of illustration and that many variations may be made therein without departing from the spirit of our invention.

Having described our invention, what we desire to secure by Letters Patent is:

1. Process for the production of a compound selected from the group consisting of those of the formulae

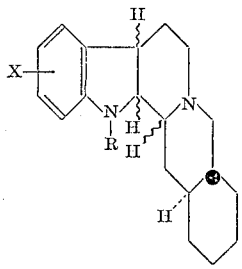 and 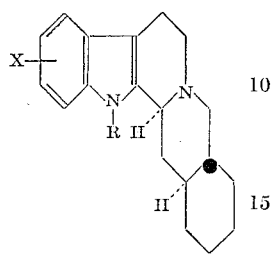

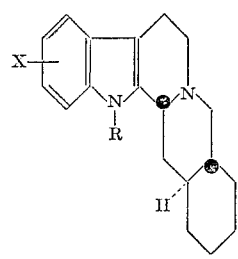

wherein X is hydrogen, and R is a member selected from the group consisting of hydrogen, and lower alkyl, which comprises:

(a) contacting a compound of the formula

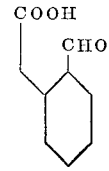

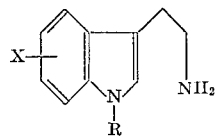

with a compound of the formula

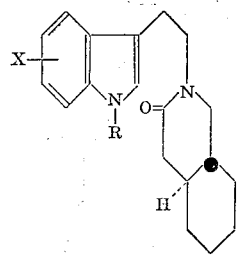

in a solvent system comprising water, triethylamine and dimethyl formamide at from 0 to −10° C., contacting the resulting product with an alkali metal borohydride at −5 to 20° C., acidifying the reaction mixture to a pH of 6 and heating the reaction mixture to about 90 to 100° C. to obtain a lactam of the formula

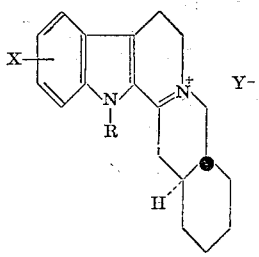

(b) contacting said lactam with a dehydration catalyst selected from the group consisting of phosphorous oxychloride and polyphosphorous acid to form a dehydroyohimbane salt of the formula

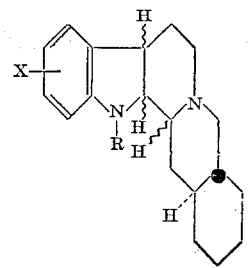

in which Y is an anion and (c) contacting said dehydroyohimbane salt with zinc-perchloric acid.

2. A compound selected from the group consisting of free base of the formula wherein X is hydrogen, and R is a member selected from the group consisting of hydrogen and, lower alkyl, the acid addition salts of said base, the quaternary ammonium salts of said base and the N-oxides of said base.

3. d,l-2,7-dihydro-10-methoxyyohimbane.

References Cited

UNITED STATES PATENTS

| | | | |
|---|---|---|---|
| 3,193,555 | 7/1965 | Shavel et al. | 260—287 |
| 3,291,800 | 12/1966 | Shavel et al. | 260—288 |
| 3,120,534 | 2/1964 | Shavel et al. | 260—288 |

JAMES A. PATTEN, *Primary Examiner.*